(12) United States Patent
Schwendt (10) Patent No.: US 7,613,914 B2
(45) Date of Patent: Nov. 3, 2009

(54) WIRELESS USER DEVICE HAVING INTEGRATED HOTSPOTTER TECHNOLOGY

(75) Inventor: Joseph H. Schwendt, Natick, MA (US)

(73) Assignee: Intel Corporation, Santa Clara, CA (US)

( * ) Notice: Subject to any disclaimer, the term of this patent is extended or adjusted under 35 U.S.C. 154(b) by 513 days.

(21) Appl. No.: 11/494,194

(22) Filed: Jul. 27, 2006

(65) Prior Publication Data

US 2008/0028054 A1 Jan. 31, 2008

(51) Int. Cl.
G06F 9/00 (2006.01)
G06F 9/24 (2006.01)
G06F 15/177 (2006.01)

(52) U.S. Cl. ............................................. 713/1; 713/2
(58) Field of Classification Search ................... 713/1, 713/2
See application file for complete search history.

(56) References Cited

U.S. PATENT DOCUMENTS

| | | | | |
|---|---|---|---|---|
| 4,228,502 | A * | 10/1980 | Wakasugi | 713/1 |
| 5,261,104 | A * | 11/1993 | Bertram et al. | 713/1 |
| 6,272,629 | B1 * | 8/2001 | Stewart | 713/2 |
| 6,367,074 | B1 * | 4/2002 | Bates et al. | 711/170 |
| 6,414,675 | B1 * | 7/2002 | Shen | 345/211 |
| 6,775,785 | B1 * | 8/2004 | Hart et al. | 713/323 |
| 7,330,450 | B1 * | 2/2008 | Lin et al. | 370/334 |
| 7,353,416 | B2 * | 4/2008 | Jeansonne et al. | 713/324 |
| 7,475,233 | B2 * | 1/2009 | Rothman et al. | 713/1 |
| 2003/0023761 | A1 * | 1/2003 | Jeansonne et al. | 709/250 |
| 2005/0176420 | A1 * | 8/2005 | Graves et al. | 455/424 |
| 2006/0229100 | A1 * | 10/2006 | Born | 455/557 |
| 2007/0060089 | A1 * | 3/2007 | Owen et al. | 455/229 |
| 2008/0209193 | A1 * | 8/2008 | Zhang et al. | 713/1 |

OTHER PUBLICATIONS

Hewlett-Packard Corporation, Intel Corporation, Microsoft Corporation, Phoenix Technologies Ltd. and Toshiba Corporation, Advanced Configuration and Power Interface Specification (ACPI), Revision 3.0, Sep. 2, 2004, pp. 1-339, 369-426, 557-580.*
"Canary Wireless Digital HotSpotter", posted Jul. 5, 2005, http://laptopmag.com/Review/Canary-Wireless-Digital-HotSpotter.htm?view=Print&Page=2,1.
"Kismet", printed Oct. 13, 2006, http://www.kismetwireless.net/documentation.shtml,26.

* cited by examiner

Primary Examiner—Thomas Lee
Assistant Examiner—Brandon Kinsey
(74) Attorney, Agent, or Firm—The Law Offices of John C. Scott, LLC; John C. Scott (57) ABSTRACT

A wireless user device includes functionality for detecting and collecting information about network hotspots in a surrounding environment before an operating system is loaded. In this manner, a mobile user can check for wireless network availability without having to first complete a lengthy boot sequence.

13 Claims, 5 Drawing Sheets

WIRELESS USER DEVICE HAVING INTEGRATED HOTSPOTTER TECHNOLOGY

TECHNICAL FIELD

The invention relates generally to wireless communication and, more particularly, to techniques for detecting the availability of a wireless network connection.

BACKGROUND OF THE INVENTION

Wireless networking technology has enabled mobile computing to become a reality. Publicly available wireless network access points now enable mobile users to achieve a network connection in a wide variety of locations when away from their homes and offices. Wireless "hot spots" are now common in public locations such as airports, restaurants, and shopping malls. Some cities are even installing wireless hot spots to cover some or all of the city. As the popularity of mobile computing increases, techniques will be needed for increasing the efficiency with which such technology is implemented and used.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
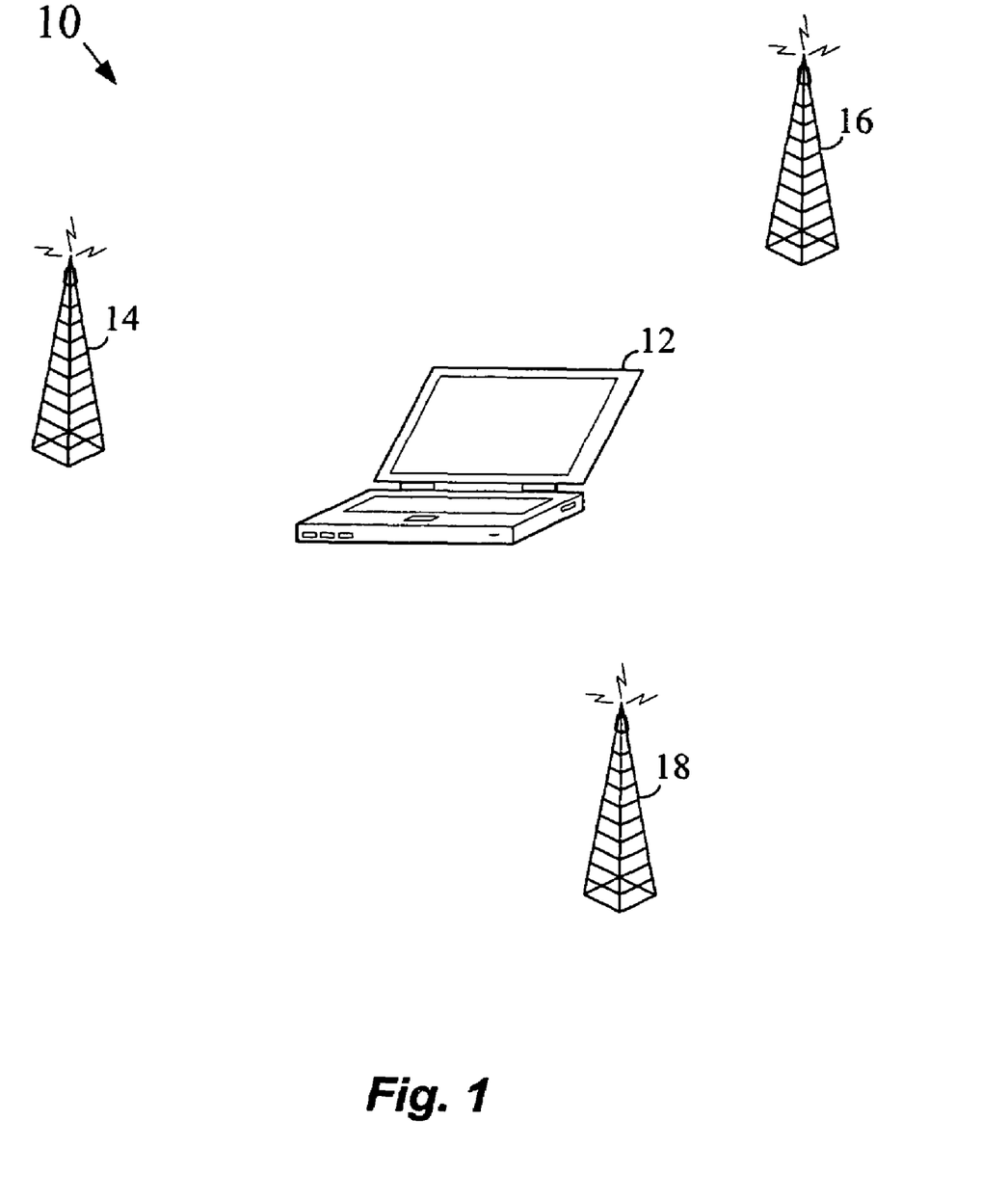
FIG. 1 is a diagram illustrating an example wireless networking scenario that may benefit from using features of the present invention.

FIG. 1 is a diagram illustrating an example wireless networking scenario 10 that may benefit from using features of the present invention. A mobile user having a wireless user device 12 is in a location away from his home or office when he decides to obtain an Internet connection to, for example, check email. The user will first turn on the wireless user device 12 and wait for a relatively long boot sequence to complete. The user may then run a wireless utility to detect available wireless access points (APs) 14, 16, 18 within wireless range of the wireless user device 12. The user may then select one of the available APs 14, 16, 18 and attempt to connect to it. If there are no available networks within range of the wireless user device 12, then the utility will indicate this to the user. If the only reason the user activated the wireless user device 12 was to perform functions requiring a wireless connection, then the user may just decide to turn off the device 12 at this point.

As is well known, the boot process for a wireless user device, during which an operating system (OS) of the device is loaded into random access memory (RAM), may take a long time to complete. In addition, the boot process may consume a significant amount of energy resources in a device having a depletable energy source. If the only tasks a user wants to perform on a user device require a network connection, then the user would not want to boot up the device if he knew that there were no available networks within range. If there are networks available, however, the user would want to boot up the device. In at least one aspect of the present invention, methods and structures are provided which enable a mobile user to determine whether a wireless connection is available before a lengthy boot sequence is fully performed. This gives the user the option to abandon the boot procedure and turn off the device if a network connection is not available.

Figure 2:
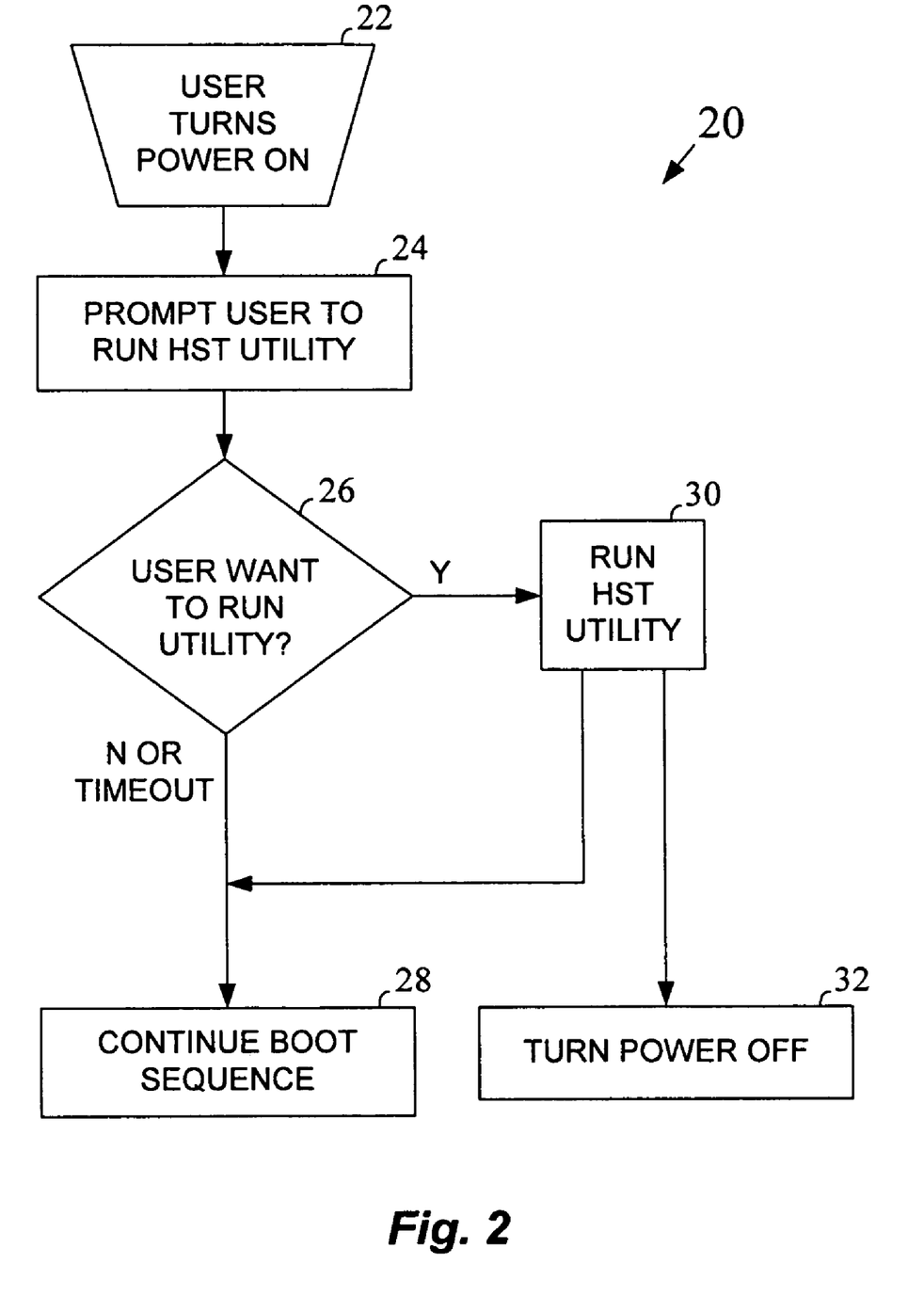
FIG. 2 is a flowchart illustrating an example method for operating a wireless user device upon power up in accordance with an embodiment of the present invention.

FIG. 2 is a flowchart illustrating an example method 20 for operating a wireless user device upon power up in accordance with an embodiment of the present invention. A user first turns on the power of the wireless user device by pressing, for example, a power button or switch (block 22). The firmware then prompts the user to determine whether the user wants to run a hotspotter technology (HST) utility (block 24). Any type of prompt may be used. In one approach, for example, a key or key sequence that needs to be pressed to launch the utility may be identified on a display of the device after power on (similar to launching the system BIOS utility). Other prompting techniques may alternatively be used. If the user indicates that he does not want to run the HST utility, or a timeout occurs, then the system boot sequence will continue (blocks 26-N, 28). The device may then proceed to load the operating system (OS) into the system RAM. If the user indicates that he does want to run the HST utility, then the HST utility may be initiated (blocks 26-Y, 30). As will be described in greater detail, the HST utility will survey the surrounding area to determine whether any networks are available. Network related information will then be presented to the user. The user will then be able to indicate how the wireless user device is to proceed. The result of running the HST utility will be either: (a) the boot sequence will continue (block 28) or (b) the device will be powered down (block 32).

The initial prompt of the user in block 24 of method 20 will occur before the operating system (OS) of the device is loaded into RAM. In this manner, should no available networks be found by the HST utility, the user may turn off the device without loading the OS. The user may also turn off the device if available networks are found, but they are unacceptable to the user. For example, in at least one embodiment, the HST utility may collect pricing information from hot spots indicating how much the hot spot charges for its services. If the user determines that the available hot spots charge too much, he can decide to turn off the device. In at least one embodiment of the present invention, the initial prompt of the user in block 24 may occur before many of the components and subsystems of the device (e.g., hard drives, optical drives, USB controllers, etc.) are energized. These components will then only be energized after the user reviews the available network information and decides to continue the boot sequence. This can reduce energy consumption significantly within the device.

In at least one embodiment of the present invention, the HST utility is stored in firmware within the wireless user device. When launched, the utility may be loaded into RAM or executed in place (XIP). Because the utility is stored in firmware, the hard drive in the device may remain off until execution of the HST utility is complete and the user decides to continue the boot process.

Figure 3:
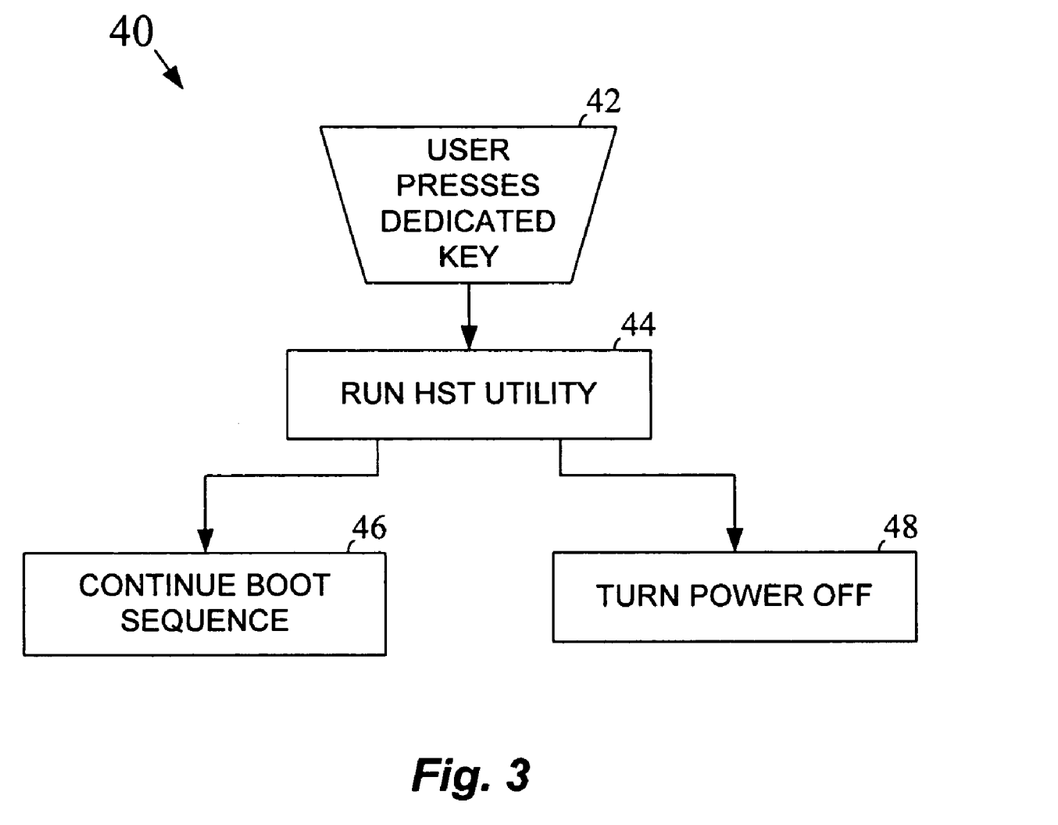
FIG. 3 is a flowchart illustrating another example method for operating a wireless user device upon power up in accordance with an embodiment of the present invention.

FIG. 3 is a flowchart illustrating another example method 40 for operating a wireless user device upon power up in accordance with an embodiment of the present invention. In this method, a dedicated hardware key or button is provided on the wireless user device for use in connection with the HST utility. When the device is off and the user wants to obtain a wireless connection, the user presses the dedicated hardware key (block 42). The device is turned on and the HST utility automatically launches (block 44). As before, information about available networks in a surrounding environment, if any, will be collected and presented to the user. The user will then be able to indicate whether to continue the boot sequence (block 46) or turn the device off (block 48).

Figure 4:
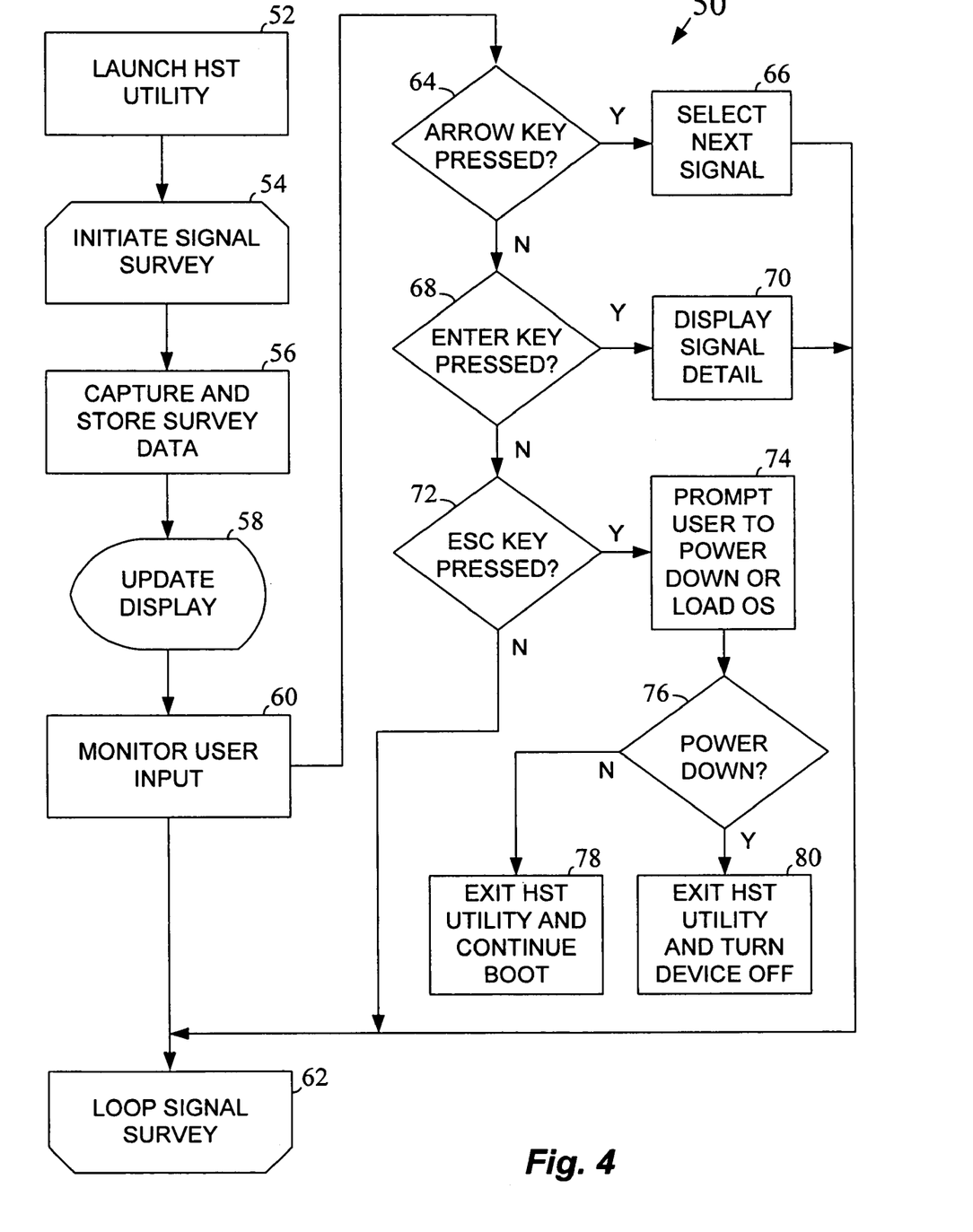
FIG. 4 is a flowchart illustrating an example method for operating a wireless user device during execution of an HST utility in accordance with an embodiment of the present invention.

FIG. 4 is a flowchart illustrating an example method 50 for operating a wireless user device during execution of an HST utility in accordance with an embodiment of the present invention. The method 40 may be performed as part of the methods 20, 40 of FIGS. 2 and 3, or during other power up methods. The HST utility is launched before an operating system has been loaded four the device (block 52). A signal survey operation may then be initiated during which wireless networking functionality associated with the device is used to detect available wireless networks (e.g., hotspots, APs, BSs, etc.) within range of the device (block 54). Survey data may be captured and stored for each detected network (block 56). The captured data may then be used to update a display that is viewable by the user (block 58). In at least one embodiment, an initial list of available wireless networks may first be presented to the user on the display (although other formats may be used). After the list is presented to the user, one or more input devices may be monitored for input from the user (block 60). This input will allow the user to review the collected network information and eventually exit the utility. In at least one embodiment, the signal survey will repeat in a loop during execution of the HST utility to keep the network information fresh (block 62).

In one possible user input approach, the arrow keys on the keyboard are used to scroll through the networks in the list, the enter key is used to bring up additional information on a currently selected network, and the escape (ESC) key is used to leave the utility. These key choices may be shown to the user on the display while the HST utility is executing. As shown in FIG. 4, while monitoring user input, if the depression of a down or up arrow key is sensed (block 64-Y), then the next (or previous) network in the list will be selected (e.g., highlighted, etc.) on the display (block 66). If the depression of the enter key is sensed (block 68-Y), then more detailed information may be shown on the display for the network that is currently selected. For example, the initial list may present basic information about the networks, such as network ID, type of network (e.g., IEEE 802.11a, b, g, IEEE 802.15, IEEE 802.16, etc.), and power level. In at least one embodiment, tabular or graphic views of the various detected signals may be presented. The more detailed presentation may show information such as, for example: type of encryption being used, if any; service provider supporting the network; QOS constraints associated with the network, if any; and/or other information. The information may be collected from the beacon or pilot signals regularly transmitted by the corresponding APs or base stations (BSs). When the detailed view is being displayed, another press of the enter key may be used to return the display to the non-detailed view.

If a depression of the escape (ESC) key is sensed (block 72-Y), then the user will be prompted to either continue the boot sequence (including the loading of the OS) or power down the device (block 74). After the user has had a chance to review the available networks, he may decide whether he wants to continue with the boot up or not. The user then presses the ESC key and it prompted for a response. If the user selects to continue, the HST utility will terminate and the boot process will resume (block 76-N, 78). If the user selects power down, the HST utility will terminate and the wireless user device will turn off (block 76-Y, 80). It should be appreciated that the above-described user input scheme represents only one example of a scheme that may be used in accordance with the present invention. Many other schemes may alternatively be used.

Figure 5:
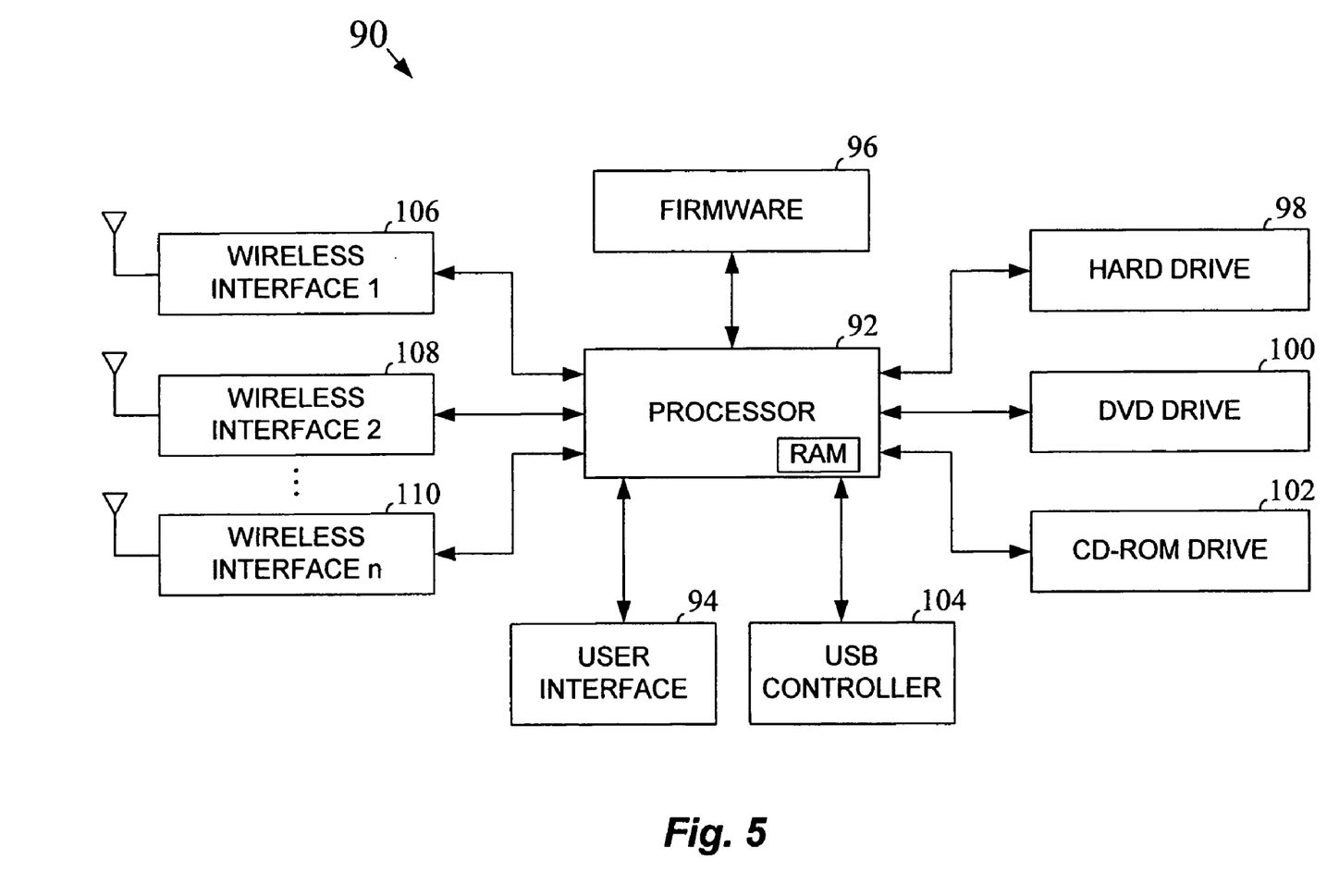
FIG. 5 is a block diagram illustrating functionality within an example wireless user device in accordance with an embodiment of the present invention.

FIG. 5 is a block diagram illustrating functionality within an example wireless user device 90 in accordance with an embodiment of the present invention. As illustrated, the wireless user device 90 may include: a processor 92 with associated RAM, a user interface 94, firmware 96, a hard drive 98, a DVD drive 100, a CD-ROM drive 102, a USB controller 104, and one or more wireless modules 106, 108, 110. Any type of transmission structures may be used to interconnect the various components of the device 90 including, for example, one or more busses, point to point interconnects, and/or others. The processor 92 may be any form of programmable digital processor including, for example, a general purpose microprocessor, a digital signal processor (DSP), a reduced instruction set computer (RISC), a complex instruction set computer (CISC), an application specific integrated circuit, and/or others. In at least one embodiment, a digital processor using Intel® Centrino® Mobile Technology (CMT) is used. The user interface 94 is operative for providing an interface between a user and the wireless user device 90. The user interface 94 may include structures such as, for example, a keyboard, a liquid crystal display (LCD), a speaker, a microphone, a mouse, a stylus, and/or any other form of device or structure that allows a user to input information or commands to the device 90 or receive information, responses, or prompts from the device 90. As will be appreciated, the specific types of input/output devices that are used will depend upon the type of wireless user device at issue. In at least one embodiment, as described previously, the user interface 94 will include a dedicated hardware key or button for use in connection with the HST functionality.

The firmware 96 may include the BIOS of the device 90 as well as the HST utility and other HST functionality discussed previously. The hard drive 98 is a mass storage device that may store, among other things, the operating system and application programs of the device 90. The DVD drive 100 and the CD-ROM drive 102 are optical drives that can read data and programs from, and possibly write data and programs to, optical disks. The USB controller 104 controls the operation of a USB bus within the device 90. The wireless interface units 106, 108, 110 are each operative for supporting wireless communication with one or more remote wireless entities. Any number of wireless interface units (i.e., one or more) may be present within a wireless user device in accordance with the present invention. Each wireless interface unit that is present may be configured in accordance with one or more wireless networking standards. For example, in one embodiment, one wireless interface unit may be for use with an IEEE 802.11a wireless network, one wireless interface unit may be for use with an IEEE 802.11b, g wireless network, one wireless interface unit may be for use with an IEEE 802.16 wireless network, and so on. Other wireless networking standards that may be represented in various embodiments include, for example, IEEE 802.15, HomeRF, Ultrawideband, HiperLAN 1, 2, and/or others.

Each wireless interface unit 106, 108, 110 may be coupled to one or more antennas to facilitate the transmission and reception of wireless signals. Any type of antennas may be used including, for example, dipoles, patches, helical antennas, microstrip antennas, and/or others.

When executed in the processor 92, the HST utility stored in the firmware 96 will perform a signal survey to detect available wireless networks within wireless range of the device 90. The HST utility may use any one or more of the wireless interface units 106, 108, 110 to perform the survey. In some embodiments of the invention, the HST utility will use all available wireless interface units 106, 108, 110 to perform the survey. In other embodiments, the survey may be limited to one or more specified units. In one possible implementation, the HST utility may be user configurable to specify the types of networks that the user would like to search for during execution of the HST utility. The utility may then limit its search to those types of networks, even though other network types are also supported. The HST utility will collect information about the various detected networks and then present the information to the user using the user interface 94. The HST utility may collect information from the pilot or beacon signals regularly transmitted by the various APs and/or BSs in the area. In at least one embodiment, the HST utility will also include the ability to request information from one or more APs and/or BSs.

As described previously, many of the components within the wireless user device 90 are not needed during the execution of the HST utility. In at least one embodiment of the invention, some or all of these components are not activated until after the user has made the decision to continue the boot process (i.e., after the HST utility has ended). The HST utility will be executed before the OS of the device 90 is loaded into RAM from the hard drive 98. Therefore, in embodiments where the HST utility in stored in the firmware 96, the hard drive 98 can remain off prior to the completion of the HST utility. Likewise, the DVD drive 100, the CD-ROM drive 102, the USB controller 104, and/or other components may remain off prior to the completion of the HST utility. The processor 92, the firmware 96, at least some of the user interface 94, and the wireless interface units 106, 108, 110 will typically have to be powered on during execution of the HST utility as they may be used by the utility.

In embodiments where a dedicated hardware key is provided for HST operation within the user interface 94, the HST utility may be automatically launched when the dedicated key is pressed. The wireless user device 90 may also be able to be configured so that the normal power button of the device automatically launches the HST utility. In other embodiments, as described above, the user may be prompted after the power is turned on as to whether he wishes to run the HST utility. If the user indicates that he does not, or if no answer is received within a predetermined period of time (e.g., a few seconds), then the system may boot as usual. In at least one embodiment, the user may launch the HST utility as a system macro (by pressing, for example, a combination of a function key and another key labeled with an HST icon). Other techniques for launching the HST utility may alternatively be used.

The techniques and structures of the present invention may be implemented in any of a variety of different forms. For example, features of the invention may be embodied within laptop, palmtop, and tablet computers having wireless capability; personal digital assistants (PDAs) having wireless capability; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. As used herein, the term "logic" may include, by way of example, software or hardware and/or combinations of software and hardware.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
executing a utility within a wireless user device that detects wireless networks operating within range of said wireless user device, before loading an operating system in said wireless user device;
presenting information about wireless networks detected by said utility, if any, to a user via a user interface; and
prompting said user for input on whether to continue a boot process or turn off said wireless user device, after presenting said information;
wherein executing a utility is performed automatically after a user presses a dedicated hardware key on said wireless user device, said dedicated hardware key being different from a normal power button of said wireless user device, wherein depression of said dedicated hardware key both turns on said wireless user device and causes said utility to be executed.

2. The method of claim 1, further comprising:
continuing a boot process when a user indicates a desire to do so in response to said prompting, wherein continuing a boot process includes loading an operating system (OS) into system RAM.

3. The method of claim 2, wherein:
executing a utility is performed before a hard drive of said wireless user device is energized, wherein continuing a boot process includes energizing said hard drive.

4. The method of claim 2, wherein:
executing a utility is performed before an optical drive of said wireless user device is energized, wherein continuing a boot process includes energizing said optical drive.

5. The method of claim 1, wherein:
prompting is performed in response to predefined user input.

6. An apparatus comprising:
a digital processor having associated random access memory (RAM);
firmware;
at least one wireless network interface unit;
a user interface; and
a hard drive storing an operating system (OS);
wherein said firmware includes instructions to execute within said digital processor before said OS is loaded into RAM, said instructions including:
first instructions to perform a signal survey using said at least one wireless network interface unit to detect available wireless networks in range of said apparatus;
second instructions to present information to a user, via said user interface, that describes available wireless networks detected by said first instructions, if any; and
third instructions to prompt said user, via said user interface, for input on whether to turn said apparatus off or to continue a boot sequence, wherein continuation of said boot sequence will include loading said OS into RAM;
wherein said user interface includes a dedicated hardware button which, when pressed, both turns on said apparatus and initiates execution of said first instructions, wherein said dedicated hardware button is different from a normal power button of said apparatus.

7. The apparatus of claim 6, wherein:
said first, second, and third instructions are to be executed before said hard drive is energized.

8. An article comprising a storage medium having instructions stored thereon that, when executed by a computing platform, operate to:
detect wireless networks operating within range of a wireless user device before an operating system (OS) is loaded into RAM in said wireless user device;
present information about detected wireless networks, if any, to a user of said wireless user device via a user interface of said wireless user device; and
prompt said user for input on whether to continue a boot process or turn off said wireless user device after said information has been presented to said user;
wherein detection of wireless networks is performed automatically after depression of a dedicated hardware key on said wireless user device, said dedicated hardware key being different from a normal power button of said wireless user device, wherein depression of said dedicated hardware key both turns on said wireless user device and causes said wireless networks to be detected.

9. The article of claim 8, wherein said instructions further operate to:
continue a boot process when a user indicates a desire to do so in response to said prompt, wherein operation to continue said boot process includes operation to load said OS into RAM.

10. The article of claim 8, wherein said instructions further operate to:
turn off said wireless user device when a user indicates a desire to do so in response to said prompt.

11. A system comprising:
at least one dipole antenna;
a digital processor having associated random access memory (RAM);
firmware;
at least one wireless network interface unit coupled to said at least one dipole antenna;
a user interface; and
a hard drive storing an operating system (OS);
wherein said firmware includes instructions to execute within said digital processor before said OS is loaded into RAM, said instructions including:
first instructions to perform a signal survey using said at least one wireless network interface unit to detect available wireless networks in range of said apparatus;
second instructions to present information to a user, via said user interface, that describes available wireless networks detected by said first instructions, if any; and
third instructions to prompt said user, via said user interface, for input on whether to turn said apparatus off or to continue a boot sequence, wherein continuation of said boot sequence will include loading said OS into RAM;
wherein said user interface includes a dedicated hardware button which, when pressed, both turns on said apparatus and initiates execution of said first instructions, wherein said dedicated hardware button is different from a normal power button of said apparatus.

12. The system of claim 11, wherein:
said instructions further include fourth instructions to prompt said user, via said user interface, for input on whether or not to search for wireless networks before the OS is loaded, wherein said first instructions are executed when said user indicates a desire to search for wireless networks.

13. The system of claim 12, wherein:
a boot sequence is continued when said user indicates that said user does not want to search for wireless networks, wherein continuation of said boot sequence includes loading said OS into RAM.

* * * * *

UNITED STATES PATENT AND TRADEMARK OFFICE
CERTIFICATE OF CORRECTION

PATENT NO.       : 7,613,914 B2                                      Page 1 of 1
APPLICATION NO.  : 11/494194
DATED            : November 3, 2009
INVENTOR(S)      : Joseph H. Schwendt It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Nineteenth Day of October, 2010

David J. Kappos
*Director of the United States Patent and Trademark Office*